April 25, 1967     G. T. DAVIES     3,315,941
AEROFOIL BLADE FOR USE IN A HOT FLUID STREAM
Filed Feb. 21, 1966
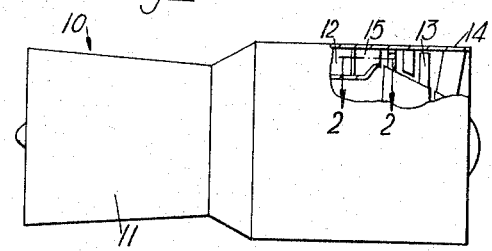
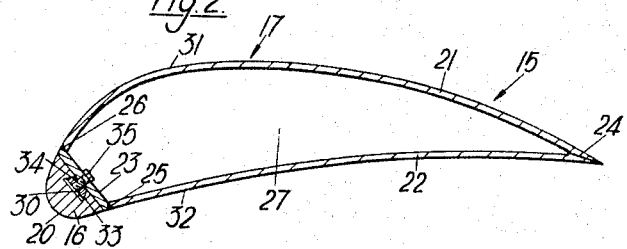
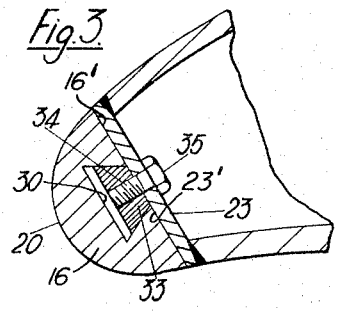
Inventor
Glyn Twiston Davies
By Cushman, Darby - Cushman
Attorneys

United States Patent Office 3,315,941
Patented Apr. 25, 1967

3,315,941
AEROFOIL BLADE FOR USE IN A HOT FLUID STREAM
Glyn Twiston Davies, Milford, Derby, England, assignor to Rolls-Royce Limited, Derby, England, a British company
Filed Feb. 21, 1966, Ser. No. 529,060
Claims priority, application Great Britain, Apr. 27, 1965, 17,759/65
6 Claims. (Cl. 253—77)

This invention concerns an aerofoil blade for use in a hot fluid stream.

According however to the present invention, there is provided an aerofoil blade for use in a hot fluid stream having a leading edge part and remaining part which abut each other and which are respectively provided with flat surfaces, the said parts abutting each other only at said surfaces to resist relative rocking thereof; the leading edge part being made of heat resistant ceramic material which has low heat conductivity and the said remaining part being formed of sheet metal wall members one of which is provided with the respective flat surface; and means securing the said parts together with the flat surfaces in firm abutment, said means comprising a wedge-shaped recess in said leading edge part which tapers towards the trailing edge of the blade, a wedge-shaped key member firmly secured in said recess, and a threaded member which secures the key member to the sheet metal wall member having the said respective flat surface; heating of the blade in the hot fluid stream increasing the force with which the leading edge part is held against the said remaining part so as further to resist said relative rocking.

The term "blade" as used in this specification is to be understood in a broad sense as including, for example, vanes and struts.

The term "heat resistant material" is to be understood to mean material which is substantially unaffected by temperature of the order of 1000° C. Preferably, the material can withstand higher temperatures than this, e.g. 1200° C., 1400° C. or 1600° C. The term "low heat conductivity" is to be understood to mean that the thermal conductivity of the material is less than that of conventional metals, e.g. les than 0.016 cal./sec./cm.$^2$/° C. and preferably less than 0.005 cal./sec./cm.$^2$/° C.

The material will generally be electrically non-conducting, but it may be inherently semi-conductive. Either of these forms of material may incorporate a proportion of metal particles to improve its heat conductivity. The resistivity of the material may be greater than 160 microhm cm. or greater than $10^5$ or $10^7$ microhm cm.

The ceramic material which may be baked or sintered and allowed to cool to form a hard rigid mass preferably contains silicon and is desirably silicon nitride. Silicon nitride can withstand temperatures of at least 1600° C. and its thermal conductivity is of the order of 0.0025 cal./sec./cm.$^2$/° C.

The key member and its said recess may be centrally disposed between opposite sides of the blade.

Alternatively, the blade may be provided with at least one said key member and recess at each of the opposite sides of the blade.

The or each said recess is preferably disposed in the said leading edge part.

The said remaining portion of the blade is preferably provided with at least one cooling fluid passage.

The blade may, for example, be a gas turbine engine nozzle guide vane.

The invention is illustrated, merely by way of example, in the accompanying drawings, in which:

FIGURE 1 is a diagrammatic view, partly in section, of a gas turbine engine provided with nozzle guide vanes according to the present invention, FIGURE 2 is a section on an enlarged scale through one such nozzle guide vane taken on the line 2—2 of FIGURE 1, FIGURE 3 is a section on an enlarged scale of part of the nozzle guide vane shown in FIGURE 2, and In FIGURE 1 there is shown a gas turbine engine 10 which may, for example, be adapted for use as a vertical lift engine and for this purpose may have a thrust to weight ratio of at least 8:1 and preferably of at least 12:1. The term "vertical lift engine" as used in this specification is to be understood to mean an engine adapted to produce vertical lift forces on an aircraft independently of those generated aerodynamically by forward flight of the aircraft.

The engine 10 comprises, in flow series, a compressor 11, combustion equipment 12, and a turbine 13, the turbine exhaust gases being directed to atmosphere through a short exhaust duct 14.

Mounted in, and at the downstream end of, the combustion equipment 12 is a ring of angularly spaced apart nozzle guide vanes 15.

As shown in FIGURE 2, each nozzle guide vane 15 is formed in two parts 16, 17, the part 16 extending throughout the whole leading edge 20 of the nozzle guide vane.

The part 17 is formed from sheet metal members 21, 22, 23, which are welded to each other at 24, 25, 26, and which define between them a passage 27 for the flow of cooling fluid therethrough. The sheet metal member 23 has an outwardly facing flat surface 23' as shown in FIGURE 3.

The part 16, which is made of silicon nitride and has a flat surface 16, as shown in FIGURE 3, is provided with a wedge-shaped recess 30 in the surface 16' which is centrally disposed between opposite sides 31, 32 of the vane 15. The flat surfaces 16', 23' abut each other, the parts 16, 17 abutting each other only at the flat surfaces 16', 23' to resist relative rocking thereof.

Firmly located in the recess 30, which tapers towards the trailing edge of the vane 15, is a wedge-shaped key member 33 which is provided with a threaded shank 34 which extends through a hole in the sheet metal member 23. Threaded onto the shank 34 is a nut 35 which bears against the inner side of the sheet metal member 23 so that tightening the nut 35 both secures the key member 33 to the sheet metal member 23 and draws it firmly against the respective sides of the recess 30 which in turn draws the flat surfaces 16' and 23' of the leading edge 16 and sheet metal member 23 respectively into firm abutment. As will be appreciated, when the vane 15 is in operation heated by the hot gases flowing thereover, the tapers of the recess 30 and key member 33 are such that the force with which the part 16 is held against the part 17 is increased so as further to resist relative rocking movement between said parts.

The vane 15 shown in FIGURE 2 may, for example, be assembled by mounting the key member 33 loosely on the sheet metal member 23, before the latter is welded to the sheet metal members 21, 22, slipping the part 16 over the key member 33 so that the latter enters the recess 30, tightening the nut 35, and then welding the sheet metal member 23 to the sheet metal members 21, 22.

I claim:

1. An aerofoil blade for use in a hot fluid stream having a leading edge part and a remaining part which abut each other and which are respectively provided with flat surfaces, the said parts abutting each other only at said surfaces to resist relative rocking thereof; the leading edge part being made of heat resistant ceramic material which has low heat conductivity and the said remaining part being formed of sheet metal wall members one of which is provided with the respective flat surface; and means securing the said parts together with the flat surfaces in firm abutment, said means comprising a wedge-shaped recess in said leading edge part which tapers towards the trailing edge of the blade, a wedge-shaped key member firmly secured in said recess, and a threaded member which secures the key member to the sheet metal wall member having the said respective flat surface; heating of the blade in the hot fluid stream increasing the force with which the leading edge part is held against the said remaining part so as further to resist said relative rocking.

2. A blade as claimed in claim 1 in which the key member and its said recess are centrally disposed between opposite sides of the blade.

3. A blade as claimed in claim 1 in which the blade is a gas turbine engine nozzle guide vane.

4. A blade as claimed in claim 3 in which the said ceramic material contains silicon.

5. A blade as claimed in claim 4 in which the said ceramic material is silicon nitride.

6. A blade as claimed in claim 1 in which the said sheet metal wall members bound an area which constitutes a cooling fluid passage.

References Cited by the Examiner
UNITED STATES PATENTS

| | | | |
|---|---|---|---|
| 2,183,158 | 12/1939 | Bennett | 170—159 |
| 2,225,779 | 12/1940 | Hart-Still. | |
| 2,482,936 | 9/1949 | Renoux | 170—159 |
| 3,215,511 | 11/1965 | Chisholm et al. | 170—159 |

MARTIN P. SCHWADRON, *Primary Examiner.*

EVERETTE A. POWELL, JR., *Examiner.*